Nov. 24, 1964   H. V. HANSEN   3,158,115
WHEEL TRACK IMPLEMENT
Filed April 26, 1963   5 Sheets-Sheet 1
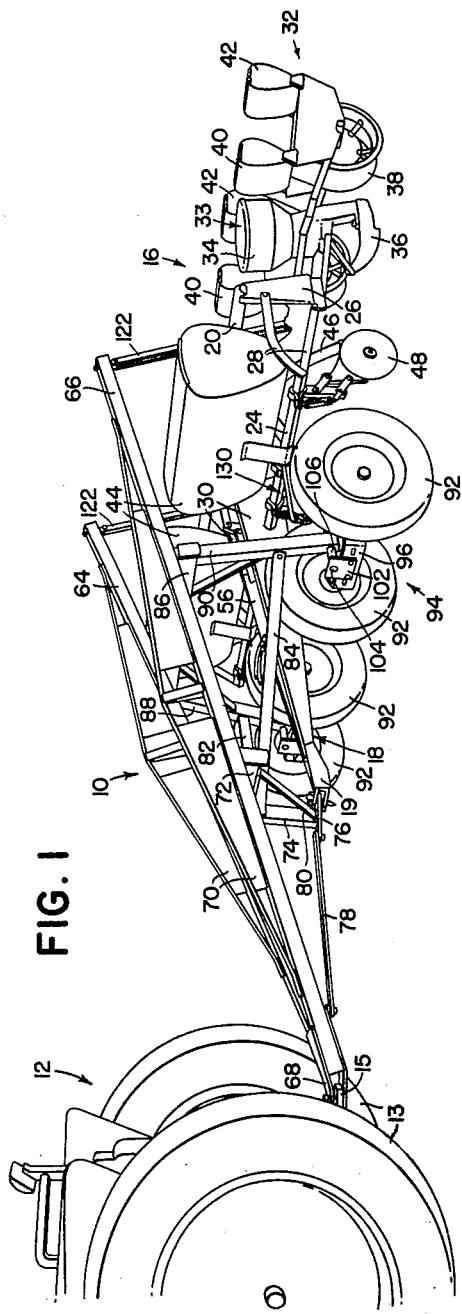
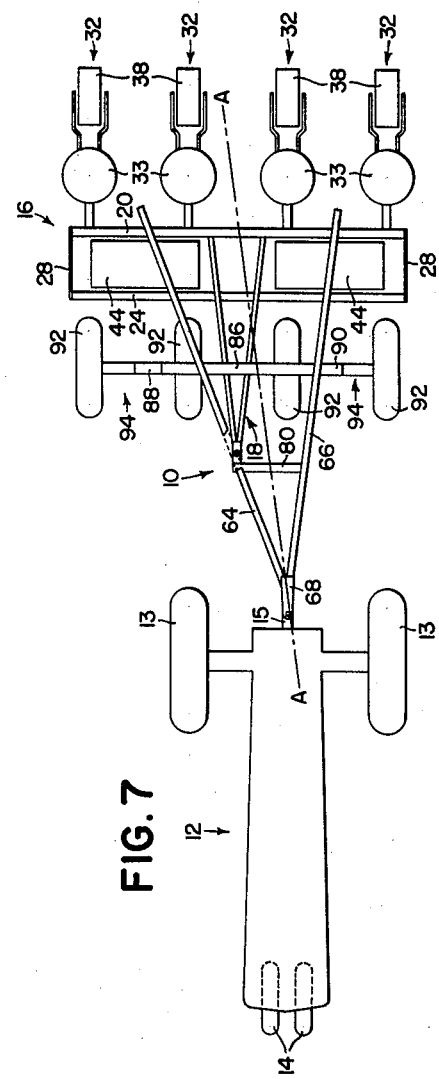
INVENTOR.
HAROLD V. HANSEN
BY
ATTORNEY

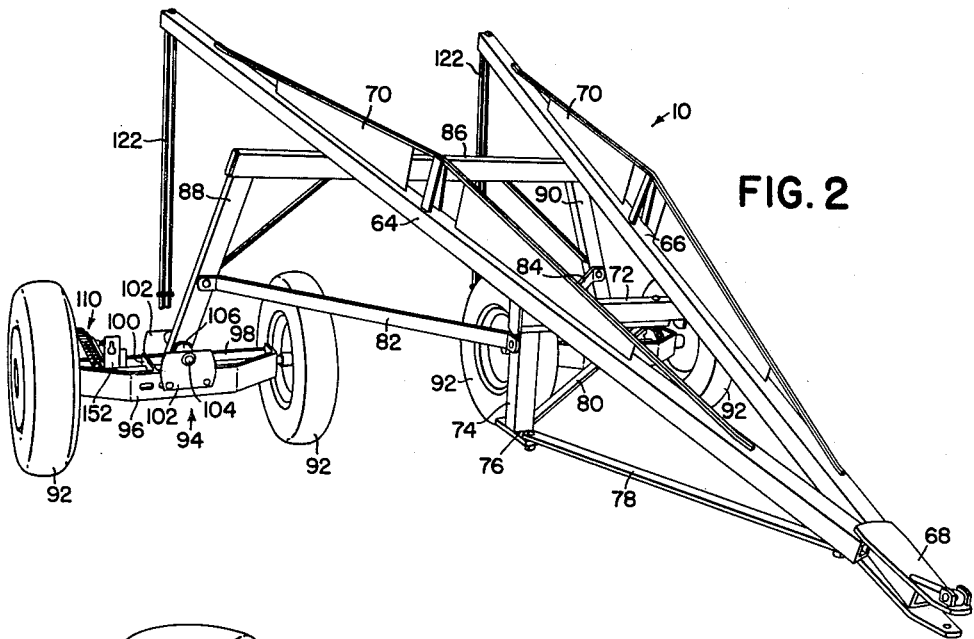
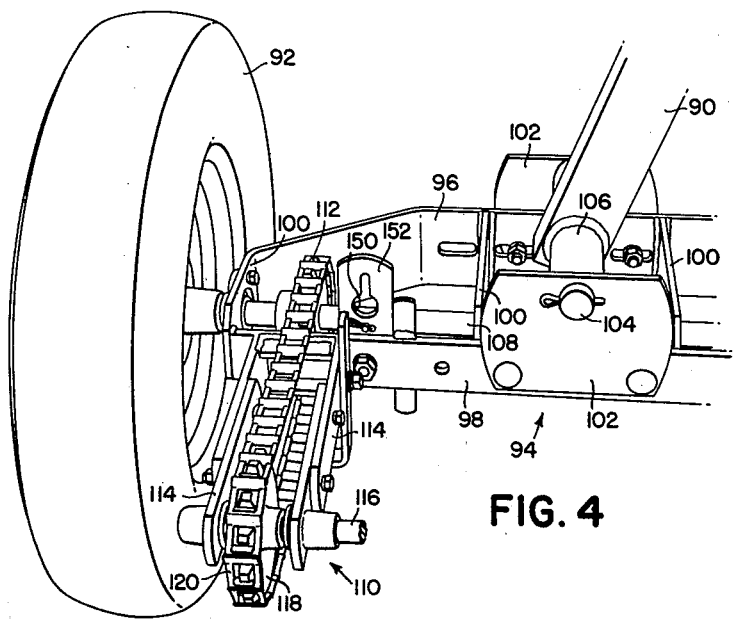

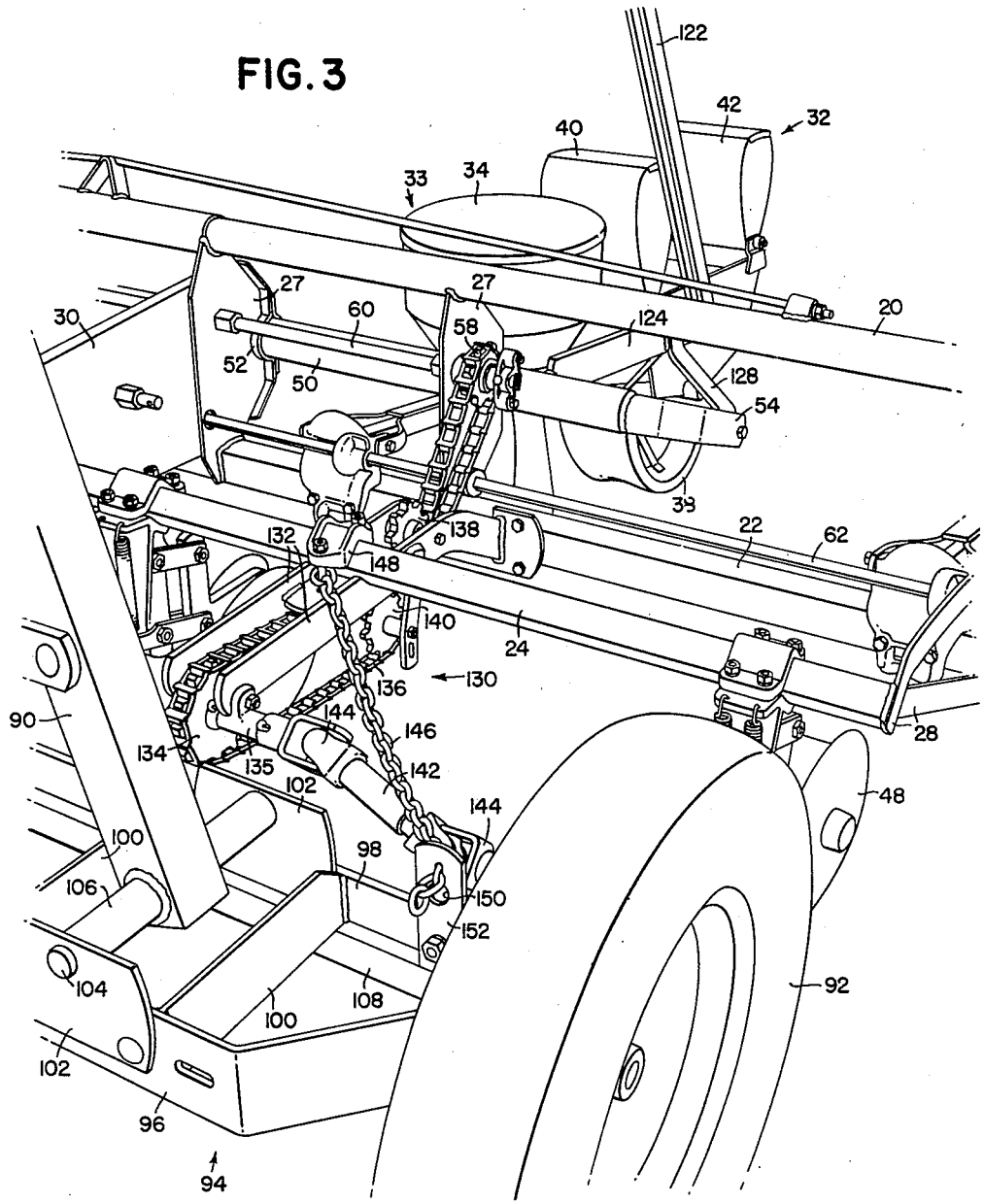

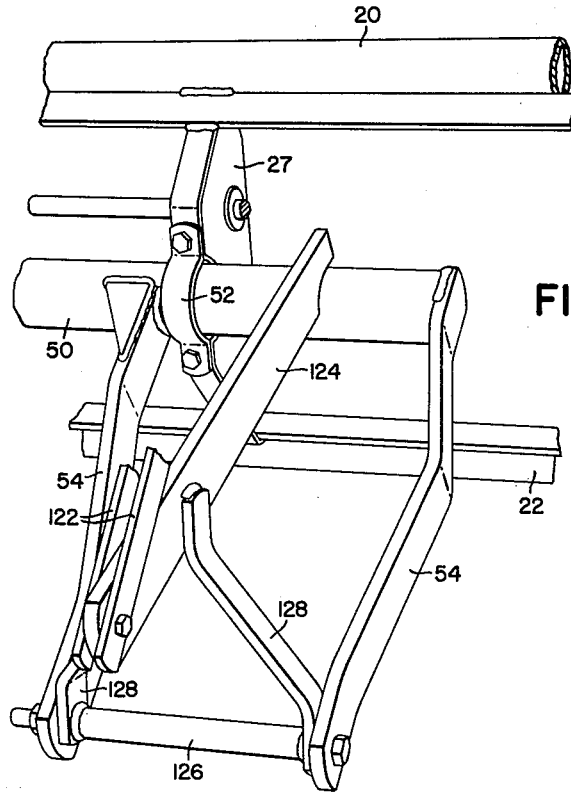

United States Patent Office 3,158,115
Patented Nov. 24, 1964

3,158,115
WHEEL TRACK IMPLEMENT
Harold V. Hansen, Hillsdale, Ill., assignor to Deere & Company, Moline, Ill., a corporation of Delaware
Filed Apr. 26, 1963, Ser. No. 275,879
21 Claims. (Cl. 111—52)

The present invention relates generally to agricultural implements and more particularly to minimum tillage or wheel track planting means.

The object and general nature of the present invention is the provision of a minimum tillage implement which is adapted to interconnect a tractor with a planter. More specifically it is an object of the present invention to provide an implement having a generally longitudinally extending frame having a portion engageable with the raising and lowering means of a conventional planter, the longitudinal frame carrying means adapted to compact the soil in advance of the seed dispensing means carried by the planter.

Another object of the present invention is to provide an implement that is adapted to compact the soil in advance of planter units carried by a conventional planter in which a forwardly extending portion of the planter is adapted to be secured to a forward portion of the implement frame.

Another object of the present invention is to provide a minimum tillage implement having a longitudinally extending frame, a portion of which is adapted to pass over at least a portion of a planter, the implement being provided with support means carried by that portion of the frame which passes over the planter to engage the raising and lowering means of the planter, the implement being provided with means to compact the soil in advance of the planter.

Another object of the present invention is to provide a minimum tillage implement which is adapted to interconnect a planter to a tractor, the minimum tillage implement being provided with soil compacting wheels and drive means interconnecting the soil compacting wheels with the drive means of the planter.

More specifically, it is an object of this invention to provide a minimum tillage implement having a generally longitudinally extending bifurcated frame of which a portion is adapted to pass over at least a portion of a planter, support means carried by the bifurcated portion and adapted to engage the raising and lowering means of a planter, soil compacting means secured to the implement frame and adapted to compact the soil in advance of planter units carried by the planter, and drive means interconnecting the soil compacting means with the drive means of a planter.

Another object of the present invention is the provision of adapter means which are adapted to engage the rockshaft and rock arms of a conventional planter, the adapter means also being able to receive support means secured at their upper end to a frame means which passes over a planter.

Another object of the present invention is the provision, in a minimum tillage implement having a plurality of soil compacting wheels carried by swingable units, of means to stabilize the swingable units to prevent excess swinging.

Another object of the present invention is the provision of an apparatus adapted to be secured to a tractor drawbar and having means laterally offset from the tractor drawbar to which a conventional planter may be hitched, the apparatus further being provided with soil compacting means which are adapted to be disposed in advance of the seed dispensing means carried by the planter.

These and other objects and advantages of the present invention will be apparent to those skilled in the art after a consideration of the following detailed description, taken in conjunction with the accompanying drawings, in which:

FIG. 1 is a perspective view of one form of applicant's minimum tillage implement, the implement being shown in its working position wherein it is interconnected with a tractor and a planter.

FIG. 2 is a perspective view taken from the other side of the implement shown in FIG. 1.

FIG. 3 is a detailed view of a portion of the implement shown in the above figures and its associated planter.

FIG. 4 is a detail view of the implement's soil compacting means.

FIG. 5 is a detailed view of a portion of the raising and lowering means of the planter provided with an adapter structure whereby it may be interconnected with the minimum tillage implement.

FIG. 7 is a somewhat schematic plan view of an implement constructed in accordance with the principles of this invention, the implement being interconnected with a planter and a tractor.

Figure 6:
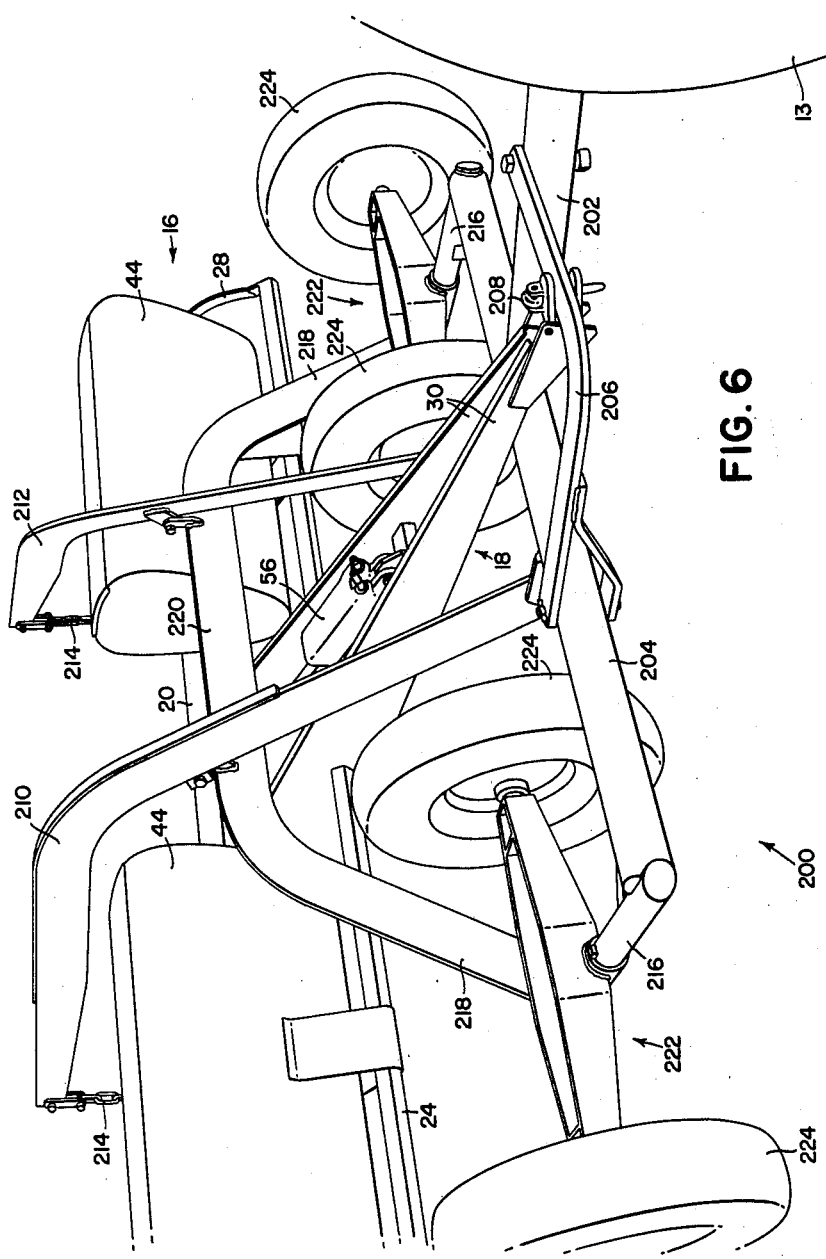
FIG. 6 is a view similar to FIG. 1 illustrating an alternative form of applicant's minimum tillage implement.

The minimum tillage implement of the present invention consists essentially of a longitudinally extending frame having a rear portion adapted to pass over the main transverse frame of a planter, the frame being supported at its forward end by a tractor drawbar and at an intermediate point by soil compacting wheels. The implement is adapted in turn to support a planter of conventional construction, an intermediate portion of the implement frame being adapted to receive the forward hitch or draft frame of a planter, and the rear portion of the implement frame being adapted to be secured to the planter rock arms which normally carry ground-engaging wheels.

More specifically, referring first to FIGS. 1–5 and 7, a minimum tillage implement of this invention, indicated generally at 10, is secured at its forward end to a conventional farm tractor 12 having spaced apart rear wheels 13, front wheels 14, and a drawbar 15. Secured to an intermediate portion of the implement 10 is a planter 16. The planter 16 is of conventional construction and is provided with a generally forwardly extending hitch or draft frame 18 having a clevis 19, a transverse main frame having an upper sill pipe 20, a lower transverse frame member or lower sill pipe 22, and a front transverse frame member 24. The transverse members 20, 22, and 24 are secured together in spaced apart relationship by end sections 26, intermediate sections 27, straps 28 and the side walls 30 of the draft frame 18. Secured to the lower transverse frame member 22 are planting units 32, the planter illustrated having four such units. The units have seed dispensing means 33 including seed hoppers 34 and planter runners 36, and press wheels 38. The planting units 32 may also be provided with insecticide and herbicide attachments 40 and 42 respectively. A fertilizer distributor 44 (FIG. 1) may be mounted on the transverse members 20, 22 and 24, if desired, the fertilizer material being distributed through conduits 46 onto the ground prepared by conventional double disk openers 48.

The conventional planter with which the implement of the present invention is adapted to be used includes means to raise and lower the transverse main frame and the associated planting units which may be in the form of a rockshaft 50 which is mounted for rotation in bearing sleeves 52 on the intermediate sections 27 of the planter. Secured to laterally outer end portions of the rockshaft 50 are rock arms 54 which are normally adapted to carry ground wheels (not shown) at their lower ends. By extending and retracting the hydraulic cylinder 56, which is connected to the rockshaft in a conventional manner, the outer ends of the rock arms 54 will be moved up and down relative to the planter frame 20, 22, 24. Thus, in a planter equipped with ground-engaging wheels the planter will be caused to be raised and lowered in response to the movement of rock arms 54. Sprockets 58, which are secured to laterally outer end portions of the drive shaft 60, are normally caused to be rotated by the ground wheels carried by rock arms 54. Rotation of the sprockets 58 and drive shaft 60 will in turn drive the fertilizer distributor 44, and the seed dispensing mechanism 33 through drill shaft 62.

One form of applicant's invention, as best seen from FIG. 2, includes a generally longitudinally extending V-shaped frame having spaced apart right- and left-hand frame members 64, 66, respectively, the frame members being secured at their forward ends to a clevis 68 which is in turn adapted to be secured to the tractor drawbar 15. Each of the frame members is reinforced by braces 70. Secured to a forward intermediate portion of the frame members 64, 66 is a transversely extending beam 72 to which a downwardly extending pillar 74 is secured at one end. As can be seen from FIG. 7 the pillar 74 is disposed to one side of the longitudinal center line A—A of the V-shaped frame. It can also be seen from FIG. 7 that the center line A—A is at an angle to the center line of the tractor 12. Secured to the lower end of the pillar 74 is a plate 76 that is adapted to pivotally receive the clevis 19 of the planter hitch or draft frame 18. The pillar is braced by straps 78, 80, 82 and 84 to prevent relative movement of the lower end thereof.

Secured to a rearward intermediate portion of the frame members 64, 66 is the bight portion 86 of a downwardly extending U-shaped subframe having right- and left-hand legs 88 and 90, respectively. The bight 86 is laterally offset with respect to the rearward intermediate portion of the V-shaped frame and is centered behind the pillar 74. Soil compacting wheels 92 are secured to a transverse unit, indicated generally at 94, which is in turn swingably mounted to the lower ends of the legs 88, 90 about a fore-and-aft extending axis. The wheels are spaced from each other a distance equal to the desired row spacing, and, as can best be seen from FIG. 7, each of the wheels precedes one of the planting units 32.

When planting, each planting unit 32 will be preceded by soil compacting wheel 92 as can best be seen from FIG. 7. If a four-row planter is to be employed, four compacting wheels will be employed in the minimum tillage implement, two of the wheels being spaced behind the rear wheels 13 of the tractor 12, one of the soil compacting wheels being generally behind the front wheels 14, and one of the soil compacting wheels being laterally outwardly offset with respect to one of the tractor rear wheels a distance equal to one row spacing. It can also be seen from FIG. 7 that the planter is secured to the implement 10 at a point which is laterally offset from the tractor center line by an amount equal to one-half the distance of the desired row spacing.

The transverse unit 94 includes front and rear transverse members 96, 98, respectively, which are secured together by plates 100. Brackets 102 are adjustably secured to the members 96, 98 and carry a fore-and-aft extending axle 104 which is journaled for rotation in sleeve 106 which is in turn welded to the lower end of a depending leg 88, 90. A transverse axle 108 is journaled for rotation in plates 100 and carries at either end the soil compacting wheels 92. A rearwardly extending drive structure, indicated generally at 110, is secured, preferably to the outer end of the transverse unit 94, and includes a sprocket 112 fixed to axle 108, rearwardly extending arms 114 fixed to the rear transverse member 98, a shaft 116 journaled for rotation in the arms 114, a sprocket 118 secured to the shaft 116, and a drive chain 120.

Swingably secured to the rear ends of the frame members 64, 66 are strap or link support members 122 which are adapted to be interconnected with a rock arm adapter as best seen in FIG. 5. The rock arm adapter includes a member 124 having a front end portion which rotatably engages the rockshaft 50 and a rear end portion engageable with the links 122. A rearward portion of the member 124 is secured to the rock arms 54 by means of a rod 126 carried in apertures in the ends of the rock arms 54, the rod having welded thereto elements 128 which are in turn welded to the member 124.

To secure a planter of the class described to the implement of the present invention, the implement is secured to a tractor whose rear wheels are preferably spaced apart a distance equal to two times the desired row spacing, and then the implement is backed up to the planter hitch, the planter clevis 19 then being attached to the plate 76 in the implement 10. Next the cylinder 56 is extended to raise the planter frame and stands (not shown) are placed under each end of the lower sill bar of the planter, then the cylinder is retracted to raise the rock arms 54 and the associated ground-engaging wheels, the ground-engaging wheels and the associated drive mechanism which normally engages the sprocket 58 then being removed. The adapter unit 124, 126, 128 is then installed on the rock arms 54 and then the straps 122 are secured to the adapter. Next it is necessary to interconnect the drive shaft 116 of the rearwardly extending drive structure 110 with the sprocket 58. To this end a forwardly extending drive structure 130 having arms 132 is secured to the lower sill bar 22. A sprocket 134 is secured to an outwardly extending shaft journaled for rotation in bearing sleeves 135 carried by the forward ends of the arms 132 and a drive chain 136 is trained over sprockets 134 and 58, the chain being supported at intermediate portions by idlers 138, 140. A telescoping drive shaft 142 provided with universal joints 144 drivingly interconnects the inwardly extending shaft 116 with the outwardly extending shaft carried by the sleeves 135. Finally, stabilizer chains 146 are provided which interconnect the planter frame with the transverse units 94, one end of each chain being secured to a bracket 148 carried by the front transverse frame member 24, and the other end of the chain being secured in keyhole slot 150 in a bracket 152 which is carried by the rear transverse member 98.

In FIG. 6 an alternative form of applicant's minimum tillage implement is illustrated. According to this form of the invention a transverse pipe member 204 is welded or otherwise secured to a forwardly extending pipe member 202 in an implement indicated generally at 200. The member 202 may be secured to a tractor drawbar in a conventional manner. A generally L-shaped member is secured at one end to the member 202 and at the other end to the member 204, and is apertured to receive the clevis pin 208 of a conventional planter 16, such as the one more fully described above. Extending upwardly and rearwardly from the member 204 are right- and left-hand planter carrying frame members 210 and 212, respectively, which are adapted to extend over the main transverse frame of the planter, and are adapted to be secured to the planter rock arms by means of chains 214. Secured to the ends of pipe 204 are rearwardly extending pipes 216 whose rear ends are secured to the lower ends of legs 218 of a generally inverted U-shaped member whose bight portion 220 is secured to the members 210, 212. Journaled about pipes 216 are transverse units, indicated generally at 222, which carry at either end soil compacting wheels 224. Drive means (not illustrated) are adapted to interconnect selected wheels 224 with the planter drive means. This implement functions in the same manner as the implement more fully illustrated in FIGS. 1–5 and 7 and further description of this form of applicant's invention is deemed to be unnecessary.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

I claim:

1. An implement adapted to be interconnected with a tractor having a drawbar and a planter having a plurality of ground-engageable seed dispensing means, means normally adapted to raise and lower the seed dispensing means relative to the ground, and a forwardly extending hitch frame; said implement comprising: a generally longitudinally extending frame, means adapted to pivotally secure the forward end of said generally longitudinally extending frame to said tractor drawbar whereby said implement is free to swing relative to said tractor, strap means carried by a generally rearward portion of said frame and engageable with said raising and lowering means, soil compacting means to support said generally longitudinally extending frame, generally vertically extending frame means fixed to said longitudinal frame and said soil compacting means and adapted to hold said soil compacting means a fixed distance from said longitudinal frame, said soil compacting means being adapted to compact the soil in advance of said seed dispensing means, and means carried by a forward portion of the frame and adapted to be secured to the forwardly extending hitch frame of the planter.

2. An implement adapted to be interconnected with a tractor and a planter having a plurality of ground-engageable seed dispensing means and means normally adapted to raise and lower the seed dispensing means relative to the ground; said implement comprising: a generally longitudinally extending frame, means adapted to pivotally secure the forward end of said longitudinal frame to said tractor for independent swinging movement of said implement relative to said tractor, support means carried by a generally rearward portion of said frame and engageable with said raising and lowering means, and means carried by said frame and adapted to compact the soil in advance of said seed dispensing means, said soil compacting means being held in vertically fixed relationship relative to said longitudinal frame whereby the weight of the longitudinal frame is carried by said soil compacting means.

3. An implement adapted to be interconnected with a tractor and a planter having a plurality of ground-engageable seed dispensing means, means normally adapted to raise and lower the seed dispensing means relative to the tractor, and a forwardly extending hitch frame normally adapted to be connected with a tractor, said implement comprising: a generally longitudinally extending frame, means adapted to pivotally secure the forward end of said longitudinal frame to said tractor for independent swinging movement of said implement relative to said tractor, support means carried by a generally rearward portion of said frame and engageable with said raising and lowering means, means carried by said frame and adapted to compact the soil in advance of said seed dispensing means, said soil compacting means being held in vertically fixed relationship relative to said longitudinal frame whereby the weight of the longitudinal frame is carried by said soil compacting means, and means carried by a forward portion of the frame and adapted to be secured to the forwardly extending hitch frame of the planter.

4. An implement adapted to be interconnected with a tractor and a planter having a plurality of ground-engageable seed dispensing means, means normally adapted to raise and lower the seed dispensing means relative to the tractor, and a forwardly extending hitch frame normally adapted to be connected with a tractor; said implement comprising: a generally longitudinally exending frame, a portion of said frame being adapted to pass over at least a portion of the planter, means adapted to pivotally secure the forward end of said longitudinal frame to said tractor for independent swinging movement of said implement relative to said tractor, support means carried by said portion of said frame and engageable with said raising and lowering means, means carried by said frame and adapted to compact the soil in advance of said seed dispensing means, means holding said soil compacting means in vertically fixed relationship relative to said longitudinal frame whereby the weight of the longitudinal frame is carried by the soil compacting means, and means carried by a forward portion of the frame and adapted to be secured to the forwardly extending hitch frame of the planter.

5. The invention set forth in claim 4 in which the compacting means comprises a plurality of wheels equal in number to the seed dispensing means, each of said wheels being rotatably carried by a transversely disposed axle; and in which said holding means includes generally transverse frame means mounted for swinging movement about fore-and-aft extending axis, defining means, said transverse frame means carrying each of said transversely disposed axles.

6. An implement adapted to be interconnected with a tractor and a planter having a plurality of drivable seed dispensing means and means normally adapted to raise and lower the seed dispensing means relative to the ground, said implement comprising: a generally longitudinally extending frame, means adapted to pivotally secure the forward end of said longitudinal frame to said tractor for independent swinging movement of said implement relative to said tractor, support means carried by a generally rearward portion of said frame and engageable with said raising and lowering means, rotatable means carried by said frame and adapted to compact the soil in advance of said seed dispensing means, said rotatable means being held in vertically fixed relationship relative to said longitudinal frame whereby the weight of the longitudinal frame is carried by said soil compacting means, and drive means adapted to interconnect said rotatable means and said seed dispensing means.

7. In combination with a planter having a transverse frame, a forwardly extending draft frame, a plurality of drivable seed dispensing means carried by said transverse frame, and planter raising and lowering means including a rockshaft having rock arm means thereon; an implement comprising a generally longitudinally extending frame having a rearward portion disposed over said transverse frame, means adapted to pivotally secure the forward end of said longitudinal frame to a tractor for independent swinging movement of said implement relative to the tractor, means swingable on said rearward portion of said frame and connectible with said rock arm, means carried by said longitudinally extending frame and adapted to compact the soil in advance of said seed dispensing means, means holding said soil compacting means in vertically fixed relationship relative to said longitudinal frame whereby the weight of the longitudinal frame is carried by the soil compacting means, and means carried by a forward portion of the frame and adapted to be secured to the forwardly extending draft frame of the planter.

8. The invention set forth in claim 7 in which the compacting means comprises a plurality of wheels equal in number to the seed dispensing means, each of said wheels being rotatably carried by a transversely disposed axle; and in which said holding means includes generally transverse frame means mounted for swinging movement about fore-and-aft extending axis, defining means, said transverse frame means carrying each of said transversely disposed axles.

9. The invention set forth in claim 8 in which drive means are provided to drivingly interconnect the compacting wheels with the drivable seed dispensing means.

10. An implement adapted to be interconnected with a tractor and a planter having a plurality of ground-engageable seed dispensing means, means normally adapted to raise and lower the seed dispensing means relative to the tractor, and a forwardly extending hitch frame normally adapted to be connected with a tractor, said implement comprisnig: a generally longitudinally extending frame having a bifurcated portion adapted to pass over at least a portion of the planter, means adapted to pivotally secure the forward end of said longitudinal frame to said tractor for independent swinging movement of said implement relative to said tractor, support means carried by said bifurcated portion and engageable with said raising and lowering means, means adapted to compact the soil in advance of said seed dispensing means, and means to interconnect the soil compacting means with the longitudinally extending frame including a generally inverted U-shaped rigid structure having an upper bight portion and depending legs, the bight portion being secured to said bifurcated portion, and means on the lower portion of said depending legs to carry said soil compacting means.

11. The invention set forth in claim 2 in which the soil compacting means are wheels.

12. An implement adapted to be interconnected with a tractor and a planter having a plurality of ground-engageable seed dispensing means, means normally adapted to raise and lower the seed dispensing means relative to the tractor, and a forwardly extending hitch frame normally adapted to be connected with a tractor; said implement comprising: a generally V-shaped longitudinally extending frame, means adapted to pivotally secure the forward end of said longitudinal frame to said tractor for independent swinging movement of said implement relative to said tractor, strap means carried by a generally rearward portion of said V-shaped frame and engageable with said raising and lowering means, means carried by said frame and adapted to compact the soil in advance of said seed dispensing means, said soil compacting means being held in vertically fixed relationship relative to said longitudinal frame whereby the weight of the longitudinal frame is carried by said soil compacting means, and means carried by a forward portion of the frame and adapted to be secured to the forwardly extending hitch frame of the planter.

13. The invention set forth in claim 12, in which said last-mentioned means is laterally offset with respect to the longitudinal center line of the V-shaped frame.

14. In combination with a tractor having a drawbar and a planter having a plurality of ground-engageable seed dispensing means and means normally adapted to raise and lower the seed dispensing means relative to the ground, an implement comprising a generally longitudinally disposed frame including two substantially straight members joined together at their forward ends, means to secure said forward ends to the tractor drawbar for independent swing movement of said implement relative to the tractor, the rearward portions of said members being spaced apart and disposed above said planter, link means interconnecting said rearward portions and said planter, and soil compacting means carried by midportions of said members and adapted to support said rearward portions in a generally elevated position when the forward ends are connected to the tractor drawbar, said soil compacting means being held in vertically fixed relationship relative to said longitudinal frame whereby the weight of the longitudinal frame is carried by said soil compacting means.

15. The invention set forth in claim 14 further characterized by said soil compacting means comprising a generally inverted U-shaped rigid frame having an upper bight portion and depending leg portions, the bight portion being secured to said midportions, and soil compacting means carried for rotation by the lower ends of said depending legs.

16. In combination with a planter having a transverse frame, a plurality of drivable seed dispensing means carried by said transverse frame, and planter raising and lowering means including a rockshaft having rock arm means normally engageable with a ground wheel; an implement comprising a generally longitudinally extending V-shaped frame having its divergent ends disposed over said transverse frame, means adapted to pivotally secure the forward end of said longitudinal frame to said tractor for independent swinging movement of said implement relative to said tractor, means interconnecting said divergent ends with said rock arm means comprising swingable link means on said divergent ends, and rock arm adapter means having a forward portion engageable with said rockshaft, a rear portion connectible with said link means, and a depending portion engageable with the ends of said rock arm means, and means carried by said longitudinally extending frame and adapted to compact the soil in advance of said seed dispensing means, said soil compacting means being held in vertically fixed relationship relative to said longitudinal frame whereby the weight of the longitudinal frame is carried by said soil compacting means.

17. The invention set forth in claim 16 further characterized by said soil compacting means comprising a generally inverted U-shaped rigid structure having an upper bight portion and depending legs, the bight portion being secured to said midportions, and soil compacting wheels carried for rotation by the lower ends of said depending legs.

18. The invention set forth in claim 17 in which drive means are provided that drivingly interconnect the compacting wheels with the drivable seed dispensing means.

19. In combination with a tractor having a drawbar and a planter having a plurality of ground-engageable seed dispensing means and means normally adapted to raise and lower the seed dispensing means relative to the ground, an implement comprising a generally longitudinally disposed V-shaped frame, means adapted to pivotally secure the forward end of said longitudinal frame to said tractor for independent swinging movement of said implement relative to said tractor, support means carried by a generally rearward portion of said V-shaped frame and engageable with said raising and lowering means, means adapted to compact the soil in advance of said seed dispensing means, and means to interconnect the soil compacting means with the longitudinally extending frame including a generally inverted U-shaped rigid structure having an upper bight portion and depending legs, the bight portion being secured to an intermediate portion of the V-shaped frame in a laterally offset relationship, and means on the lower portion of said depending legs to carry said soil compacting means, the parts being so constructed and arranged that the soil compacting means are laterally offset with respect to said intermediate portion and are disposed in advance of said seed dispensing means.

20. In combination with a tractor having a drawbar and a planter having a transverse frame, a forwardly extending draft frame, a plurality of drivable seed dispensing means carried by said transverse frame and planter raising and lowering means; an implement comprising a generally longitudinally extending V-shaped frame, means on the apical portion of the V-shaped frame adapted to be secured to the tractor drawbar, the divergent ends of said V-shaped frame being disposed over said transverse frame, swingable link means on said divergent ends connectible with said raising and lowering means, means carried by a forward portion of the V-shaped frame in laterally offset relationship with the longitudinal center line of the V-shaped frame and adapted to be secured to the forward extending draft frame of the planter, rotatable means adapted to compact the soil in advance of said seed dispensing means, means to interconnect said soil compacting means with the longitudinally extending frame, said last-mentioned means including a generally inverted U-shaped structure having a bight portion and depending legs, the bight portion being secured to an intermediate portion of the V-shaped frame in a laterally offset relationship, means on the lower portion of the depending legs to rotatably carry said soil compacting means, and drive means interconnecting said soil compacting means with said drivable seed dispensing means.

21. The combination comprising: a tractor; a planter having a transverse frame, a forwardly extending draft frame, and a plurality of drivable seed dispensing means carried by said transverse frame; an implement comprising a generally longitudinally extending frame having a rearward portion disposed over said transverse frame, means adapted to pivotally secure the forward end of said longitudinal frame to the tractor for independent swinging movement of said implement relative to the tractor, means carried by said longitudinally extending frame and adapted to compact the soil in advance of said seed dispensing means, means holding said soil compacting means in vertically fixed relationship to said longitudinal frame whereby the weight of the longitudinal frame is carried by the soil compacting means, means controllable from the tractor to vary the vertical distance between the planter and the rearward portion of the longitudinally extending frame while maintaining the same vertical distance between the soil compacting means and the longitudinally extending frame, and means carried by a forward portion of the longitudinally extending frame and adapted to be connected with the forwardly extending draft frame of the planter.

References Cited in the file of this patent

UNITED STATES PATENTS

| | | |
|---|---|---|
| 2,269,987 | Raney et al. | Jan. 13, 1942 |
| 2,930,335 | Hage | Mar. 29, 1960 |
| 3,037,470 | Watson et al. | June 5, 1962 |
| 3,055,322 | Oehler et al. | Sept. 25, 1962 |